United States Patent [19]

Cummins

[11] Patent Number: 5,250,861
[45] Date of Patent: Oct. 5, 1993

[54] SUPERCONDUCTOR ELECTRICAL POWER GENERATING SYSTEM

[76] Inventor: Stephen F. Cummins, 443 Taunton St., Wrentham, Mass. 02093

[21] Appl. No.: 867,393

[22] Filed: Apr. 13, 1992

[51] Int. Cl.$^5$ ............................................. H02K 1/22
[52] U.S. Cl. ......................................... 310/10; 310/13; 310/40 R; 310/52; 310/104; 310/156
[58] Field of Search ............... 310/10, 184, 52, 208, 310/40 R, 114, 23, 268, 166, 85, 86, 184, 104, 208, 105, 106, 109, 13, 34, 181, 248, 155, 156; 322/3

[56] References Cited

U.S. PATENT DOCUMENTS

| | | | |
|---|---|---|---|
| 3,335,489 | 8/1967 | Volger | 310/40 R |
| 3,564,307 | 2/1971 | Kawabe | 310/10 |
| 3,742,265 | 6/1973 | Smith, Jr. | 310/10 |
| 3,904,901 | 9/1975 | Renard | 310/52 |
| 3,934,163 | 1/1976 | Mailfret | 310/10 |
| 3,956,648 | 5/1976 | Kirtley, Jr. | 310/10 |
| 4,146,804 | 3/1979 | Carr, Jr. | 310/52 |
| 4,176,291 | 11/1979 | Rabinowitz | 310/10 |
| 4,386,246 | 5/1983 | Schur | 310/10 |
| 4,908,347 | 3/1990 | Denk | 310/40 R |

*Primary Examiner*—R. Skudy
*Attorney, Agent, or Firm*—John E. Toupal; Harold G. Jarcho

[57] ABSTRACT

An electric power generating system including a plurality of individual magnetic field sources each producing a magnetic field in a distinct region; a plurality of electrical conductors each disposed in a different one of regions so as to be linked by flux lines of the magnetic fields therein; a superconductive shield maintained at a temperature sufficient to achieve a superconducting state thereof; and a motive mechanism for producing movement of the superconductive shield with respect to the magnetic field sources such that the superconductive shield sequentially moves through the regions to intercept at least a portion of the magnetic field therein and thereby vary the magnetic flux linked with the conductor therein and thereby produce therein an electromagnetic force.

11 Claims, 2 Drawing Sheets

SUPERCONDUCTOR ELECTRICAL POWER GENERATING SYSTEM

BACKGROUND OF THE INVENTION

This invention relates generally to an electrical power generating system and more particularly, to a system in which a magnetic flux linked with a conductor is periodically varied to induce an electromotive force therein.

Because of the high and ever increasing cost of fuels used to generate electrical power, a need exists for more efficient generators of electrical energy. One promising approach to electrical energy generation contemplates the use of magnetic blocking devices to periodically interrupt a magnetic field and thereby generate electrical current in a conductive sensor. Suitable magnetic blocking devices include superconductive materials that exhibit the Meissner effect. Prior electrical energy generating system of this type are disclosed, for example, in U.S. Pat. Nos. 3,564,307 and 4,385,246. Disadvantages of prior Meissner effect systems include limited electrical output potential and less than satisfactory efficiency.

The object of this invention, therefore, is to provide an improved electrical energy generation system utilizing a magnetic blocking mechanism for periodically interrupting a magnetic field.

SUMMARY OF THE INVENTION

The invention is an electric power generating system including a plurality of individual magnetic field sources each producing a magnetic field in a distinct region; a plurality of electrical conductors each disposed in a different one of the regions so as to be linked by flux lines of the magnetic fields therein; a magnetic shield, preferably a superconductive means maintained at a temperature sufficient to achieve a superconducting state thereof; and a motive mechanism for producing movement of the superconductive means with respect to the magnetic field sources such that the superconductive means sequentially moves through the regions to intercept at least a portion of the magnetic field therein and thereby vary the magnetic flux linked with the conductor therein and thereby produce therein an electromagnetic force. Coupling of one superconductive means with a plurality of magnetic field sources minimizes operational losses to increase system efficiency.

According to one feature of the invention, each of the magnetic field sources is a superconductive solenoid. Maximum efficiency is obtained by use of superconductive solenoid sources.

According to other features, the invention includes a plurality of additional magnetic field sources each disposed to produce a magnetic field in one of the plurality of regions; the superconductive means comprises a first superconductive means sequentially movable through the regions to intercept at least a portion of the magnetic field produced therein by one of the individual magnetic field sources, and a second superconductive means sequentially movable through the regions to intercept at least a portion of the magnetic field produced therein by one of the additional magnetic field sources; and each of the individual sources is aligned with one of the additional sources and the individual and additional sources are positioned on opposite sides of the conductor means disposed in the distinct region associated therewith. This arrangement increases electrical output potential in a compact configuration.

In one embodiment of the invention, the motive mechanism is a rotary drive, and the superconductive means comprises a planar superconductive member coupled to the drive and sequentially rotated thereby through the distinct regions in planes substantially perpendicular to the magnetic fields. This arrangement provides enhanced operating efficiency.

In another embodiment of the invention, the individual magnetic field sources are arranged in an annular array and produce radially directed magnetic fields; each of the electrical conductors is radially aligned with one of the sources; the superconductive means comprises a cylindrical wall retaining a plurality of superconductive members and straddled by the sources and the conductors; and the cylindrical wall is axially rotatable to move each of the superconductive members sequentially between each aligned pair of the sources and the conductors.

According to another important feature, the system includes electrical circuit means for dissipating electrical circulatory current produced in the superconductive means. Dissipation of circulatory current reduces electrical interference that can reduce system efficiency.

The invention also encompasses a power generating system including a plurality of individual magnetic field sources each producing a magnetic field in a given region; an electrical conductor disposed in the given region; a plurality of individual superconductive means each maintained at a temperature sufficient to achieve a superconducting state thereof; and a motive mechanism coupled to each superconductive means and operable to produce motion thereof within the given region and between a different one of the magnetic field sources and the conductor, and wherein passage of each superconductive means through the given region varies the magnetic flux linked with the conductor and thereby produces therein an electromagnetic force. Increased efficiency is also provided by the provision of plural fields coupled to a single conductive sensor and plural magnetic shields.

According to features of this invention, the individual sources are aligned and disposed on opposite sides of the conductor; each of the individual superconductive means moves between the conductor and a different one of the magnetic field sources; and the motive mechanism comprises a reciprocating drive producing reciprocating motion of the superconductive means in paths perpendicular to the magnetic field. This arrangement improves efficiency in a convenient configuration.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
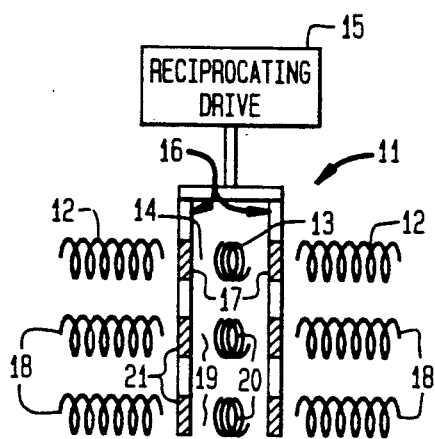
FIG. 1 is a front view of one embodiment of the invention.

An electric power generating system 11 includes a plurality of magnetic field sources provided by individual superconducting solenoids 12 and a bundle 13 of electrical conductors. The sources of solenoids 12 each direct a magnetic field through a region 14 occupied by the electrical conductor bundle 13. Disposed for reciprocating movement in the region 14 are a pair of magnetically porous plates 16 disposed on opposite sides of the bundle 13 and each retaining a planar sheet 17 of superconductive material. A reciprocating drive mechanism 15 is coupled to the plates 16 and produces reciprocating movement thereof in planes substantially perpendicular to the magnetic field in the region 14. A suitable source of coolant (not shown) maintains the solenoid 12 and superconductive sheets 17 at or below their critical temperature threshold in a manner well known in the art. In that condition, the sheet functions as a magnetic shield effectively blocking lines of magnetic flux. Additional pairs of source solenoids 18 displaced in the direction of reciprocating movement direct magnetic fields into regions 19 each occupied by an additional conductor bundle 20. Reciprocated within the regions 19 are additional pairs of superconductive sheets 21 disposed on opposite sides of the bundles 20.

Figure 2:
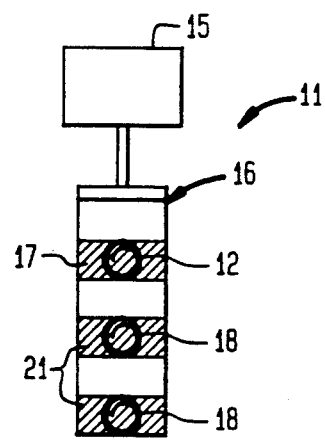
FIG. 2 is a side-view of the embodiment shown in FIG. 1.
Figure 3:
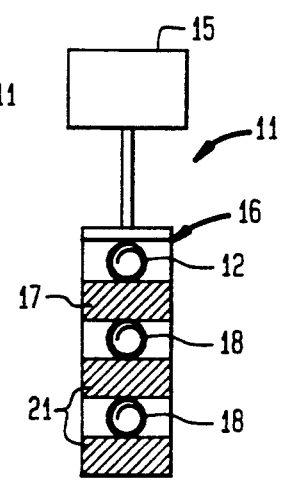
FIG. 3 is a view similar to that shown in FIG. 2 but in a different position.

With the system 11 in the operative condition shown in FIG. 2, the superconductive sheets 17 and 21 are positioned directly between the sources of solenoids 12 and 18 and, respectively, the electrical conductor bundles 13 and 20. Accordingly, the lines of flux in the regions 14 and 19 are blocked by the sheets 17 and 21 and prevented from reaching the electrical conductor bundles 13 and 20. However, as shown in FIG. 3, with the plate 16 having moved the sheets 17 and 21 into positions outside the regions 14 and 19, the flux lines produced by the sources 12 and 18 pass through the region 14 and 19 to be linked with the electrical conductor bundles 13 and 20. During movement between the positions shown in FIGS. 2 and 3, the moving superconductive sheets 17 and 21 will vary the magnetic flux linked with the bundles 13 and 20 between minimum and maximum levels. Because of a varied magnetic flux linkage an electromagnetic force is generated in each of the electrical conductor bundles 13 and 20. That electromagnetic force can be used in a conventional manner to power electrical equipment.

Figure 4:
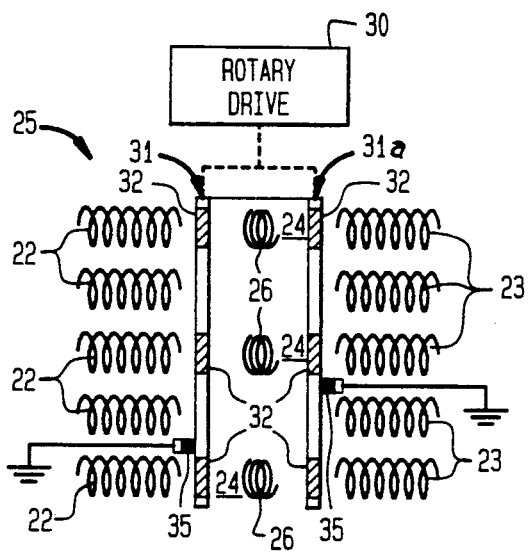
FIG. 4 is a front view of another embodiment of the invention.
Figure 5:
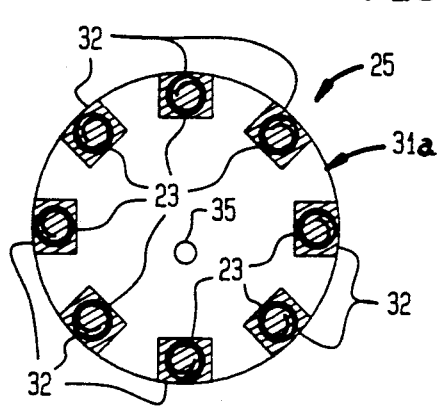
FIG. 5 is a side view of the embodiment shown in FIG. 4.
Figure 6:
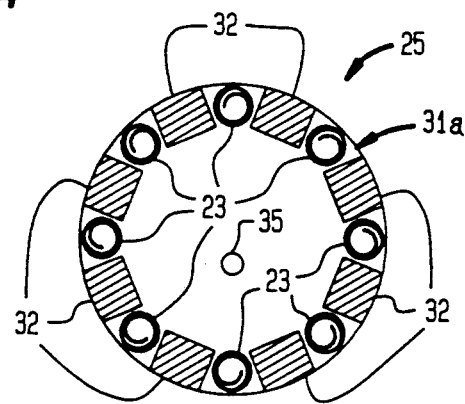
FIG. 6 is a view similar to that shown in FIG. 5 but in a different operating position.

Another electrical power generating system embodiment 25 is depicted in FIGS. 4-6. A plurality of individual superconducting solenoid sources 22 and a plurality of additional solenoid sources 23 are aligned on opposite sides of distinct regions 24 into which flux lines are directed. Disposed in each of the regions 24 is a bundle 26 of electrical conductors. Mounted for rotation within the regions 24 are first and second parallel, magnetically porous discs 31 and 31a each retaining a plurality of circumferentially spaced apart planar sheets 32 of superconductive material. A rotary drive 30 is coupled to the discs 31 so as to produce rotation of the sheets 32 in planes substantially perpendicular to the solenoid flux lines produced by the sources 22, 23. Again, a suitable coolant source (not shown) provides coolant for maintaining the solenoid sources 22, 23 and the superconductive sheets 32 at or below in their critical temperature thresholds.

With the first and second discs 31 and 31a in the positions shown in FIG. 5, the superconductive sheets 32 are aligned with the bundles 26 so as to shield them from the flux lines produced by the solenoid sources 22 and 23. However, with the discs 31 and 31a rotated into the positions shown in FIG. 6, the electrical conductor bundles 26 are misaligned with the sheets 32 which therefore fail to shield the conductor bundles 26 from the flux lines produced by the sources 22 and 23. It will be apparent that during rotational movement of the discs 31 and 31a the first and second sets of rotating superconductive magnetic shield sheets 32 will continuously vary the magnetic flux linkage existing between the solenoid sources 22, 23 and the bundles 26. Accordingly, an electromagnetic force is generated in the electrical conductor bundles 26. That electromagnetic force can be used in a conventional manner to power electrical equipment. During rotation of the discs 31, 31a, circulatory current produced in the sheets 32 are dissipated by an electrical circuit consisting of grounded brushes 35.

Figure 7:
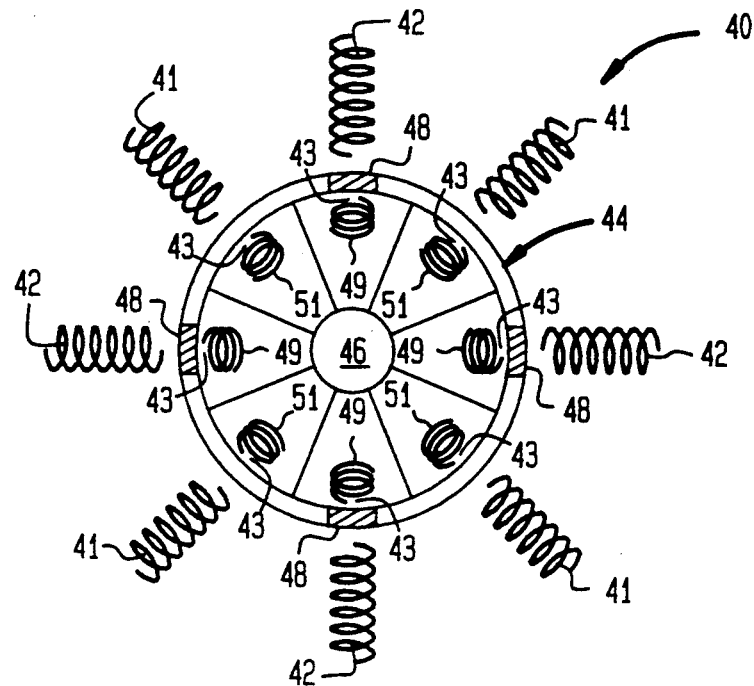
FIG. 7 is a front view of a third embodiment of the invention.
Figure 8:
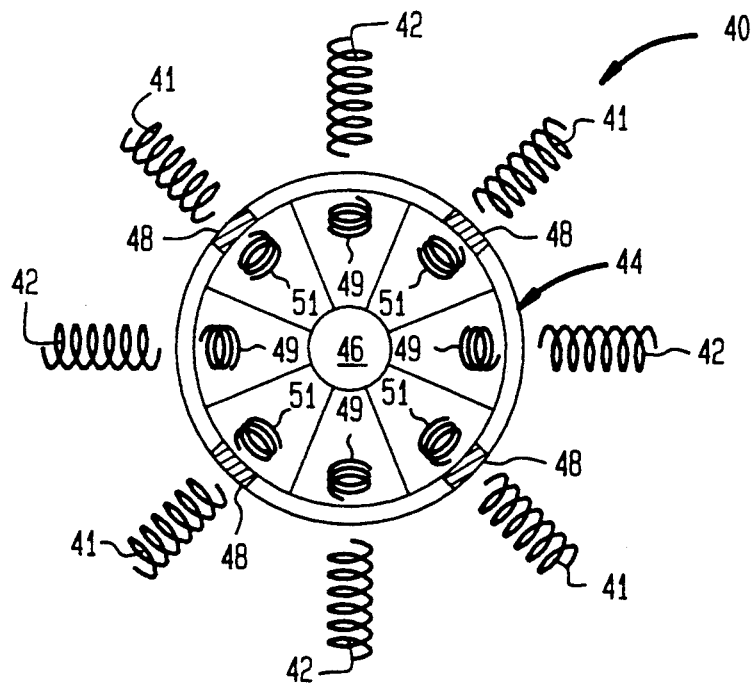
FIG. 8 is a view similar to FIG. 7 but in a different operating position.

Another electric power generating system embodiment 40 is depicted in FIGS. 7 and 8. Superconducting individual solenoid sources 41, 42 are alternately arranged in a radial array, and each adjacent to a region 43. Disposed between the regions 43 and the sources 41, 42 is a hollow cylinder 44 made of a magnetically porous material. A rotary drive mechanism 46 is coupled to the cylinder 44 and produces rotation thereof. Retained at diametrically opposed positions on the outer surface of the cylinder 44 are a plurality of arcuate sheets 48 of superconductive material. Disposed within the cylinder 44 is an array of alternating electrical conductor bundles 49, 51, each positioned in one of the regions 43 and radially aligned with one of the sources 41. Again, a suitable coolant source (not shown) provides coolant for maintaining the solenoid sources 41, 42 and the superconductive sheets 48 at or below in their critical temperature thresholds. The rotating cylinder 44 produces rotational movement of the sheets 48 in an orbital path between the sources 41, 42 and the bundles 49, 51.

With the cylinder 44 in the rotary position shown in FIG. 7, superconductive sheets 48 effectively shield the electrical conductor bundles 49 from the magnetic flux lines produced by the sources 42. Conversely, the magnetic flux lines produced by the sources 41 are linked to the electrical conductor bundles 51. Subsequently, with the cylinder 44 in the position shown in FIG. 8, the superconductive sheets 48 effectively shield the electrical conductor bundles 51 from the flux lines produced by the sources 41 while permitting linkage between the flux lines produced by the sources 42 and the electrical conductor bundles 49. It will be apparent that during rotation of the cylinder 44 into positions between those illustrated in FIGS. 7 and 8, the superconductive sheets 48 will continually vary the flux linkage to the electrical conductor bundles 49, 51 between maximum and minimum levels. Because of the varying flux linkage an electromagnetic force is generated in each of the bundles 49, 51. That electromagnetic force can be used in a conventional manner to power electrical equipment.

Obviously, many modifications and variations of the present invention are possible in light of the above teachings. For example, permanent magnets can be substituted for the electromagnets described and shown for the preferred embodiments. Also, a plurality of the embodiments 11 can be arranged with their magnetic sources aligned and a common drive 18 coupled to their shield plates 16. A similar configuration can be employed for the embodiment 25. In addition, the disclosed superconductive solenoids could be superconductive electromagnets. It is to be understood, therefore, that the invention can be practiced otherwise than as specifically described.

What is claimed is:

1. An electric power generating system comprising:
   a plurality of individual magnetic field sources each producing a magnetic field in a different distinct region;
   an electrical conductor means disposed in each of said different distinct regions so as to be linked by magnetic flux of said magnetic field therein;
   magnetic shield means; and
   motive means for producing movement of said shield means with respect to said magnetic field sources such that said shield means sequentially moves through said different distinct regions to intercept at least a portion of the magnetic field therein and thereby vary said magnetic flux linked with said conductor means therein and thereby produce in said conductor means an electromagnetic force; and including a plurality of additional magnetic field sources each disposed in a different one of different regions.

2. A system according to claim 1 wherein said motive means comprises a rotary drive means.

3. A system according to claim 2 wherein said shield means comprises a planar magnetic shield member coupled to said drive means and sequentially rotated thereby through said distinct regions.

4. A system according to claim 3 wherein said planar magnetic shield member is disposed substantially perpendicular to said magnetic field in each said distinct region and is rotated in a plane substantially perpendicular thereto.

5. A system according to claim 4 wherein said magnetic shield means comprises a rotatable disc retaining a plurality of circumferentially spaced apart magnetic shield members each rotated sequentially through said distinct regions.

6. A system according to claim 5 wherein each of said magnetic field sources is a superconductive solenoid, and each said magnetic shield member is a superconductor.

7. A system according to claim 6 wherein said shield means comprises a first magnetic shield means sequentially movable through said regions to intercept at least a portion of said magnetic field produced therein by one of said individual magnetic field sources, and a second magnetic shield means sequentially movable through said regions to intercept at least a portion of said magnetic field produced thereby by one of additional magnetic field sources.

8. A system according to claim 7 wherein each of said individual magnetic field sources is aligned with one of said additional sources and said individual magnetic field sources and said additional magnetic field sources are positioned on opposite sides of the conductor means disposed in the distinct region associated therewith.

9. A system according to claim 8 wherein each of said first and second magnetic shield means comprises a rotatable disc retaining a plurality of circumferentially spaced apart magnetic shield members, and said discs are disposed on opposite sides of said electrical conductor means.

10. A system according to claim 9 wherein each of said magnetic field sources is a superconductive solenoid, and each said magnetic shield member is a superconductor.

11. A system according to claim 1 including electrical circuit means for dissipating electrical circulatory current produced in said magnetic shield means.

* * * * *